United States Patent [19]

Hamm et al.

[11] 4,278,485

[45] Jul. 14, 1981

[54] METHOD OF FORMING COMPOSITE WOUND STRUCTURE

[75] Inventors: Robert A. Hamm, Bellevue; Philip C. Whitener, Seattle, both of Wash.

[73] Assignee: The Boeing Company, Seattle, Wash.

[21] Appl. No.: 149,890

[22] Filed: May 14, 1980

Related U.S. Application Data

[62] Division of Ser. No. 930,457, Aug. 2, 1978, Pat. No. 4,230,293.

[51] Int. Cl.$^3$ .......................... B65H 81/04; B64C 1/00
[52] U.S. Cl. ....................................... 156/173; 156/250
[58] Field of Search ............... 156/173, 175, 172, 169, 156/187, 185, 191, 250; 244/118, 113, 125, 126; 428/35, 36, 310, 315, 116, 377; 220/1 R, 3, DIG. 23, 83

[56] References Cited

U.S. PATENT DOCUMENTS

| | | | |
|---|---|---|---|
| 3,300,354 | 1/1967 | Duft | 156/175 |
| 3,687,768 | 8/1972 | Vaitses et al. | 156/212 |
| 4,012,549 | 3/1977 | Slysh | 244/119 |
| 4,112,644 | 9/1978 | Allen | 220/83 |
| 4,118,262 | 10/1978 | Abbott | 156/175 |
| 4,137,354 | 1/1979 | Mayers et al. | 156/175 |
| 4,147,822 | 4/1979 | Kallmeyer et al. | 428/35 |

Primary Examiner—Michael W. Ball
Attorney, Agent, or Firm—Morris A. Case; Bernard A. Donahue

[57] ABSTRACT

An elongate hollow structure with a plurality of reinforcements arranged in a pattern and acting as spacers between a pair of skins. The skins are of resin impregnated wound filaments with reinforcing strips of facing preimpregnated wound filaments that crisscross at the spacing reinforcements, abutting panels extend between adjacent reinforcing spacers to fill the space between the skins, and the structure is bonded with resin into a composite structure.

7 Claims, 10 Drawing Figures

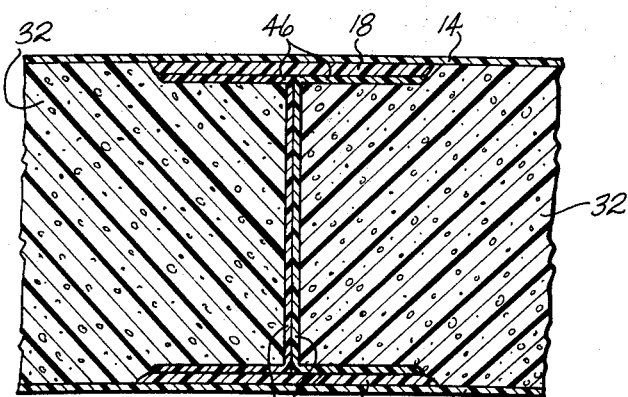
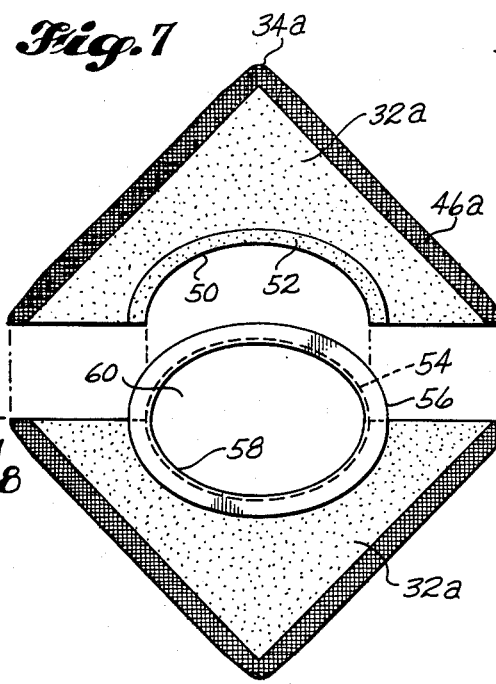
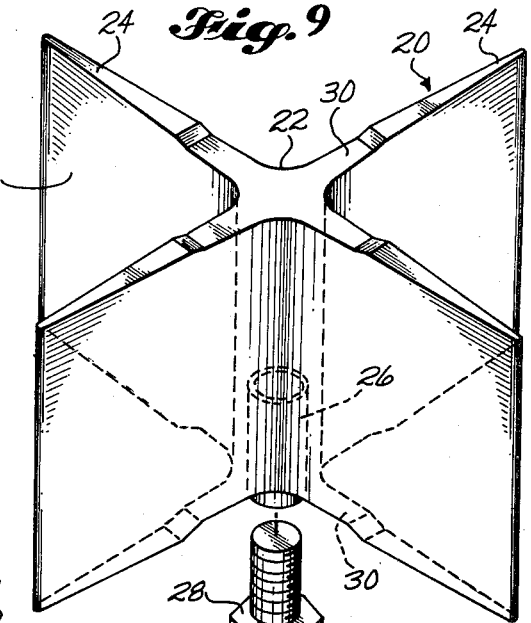
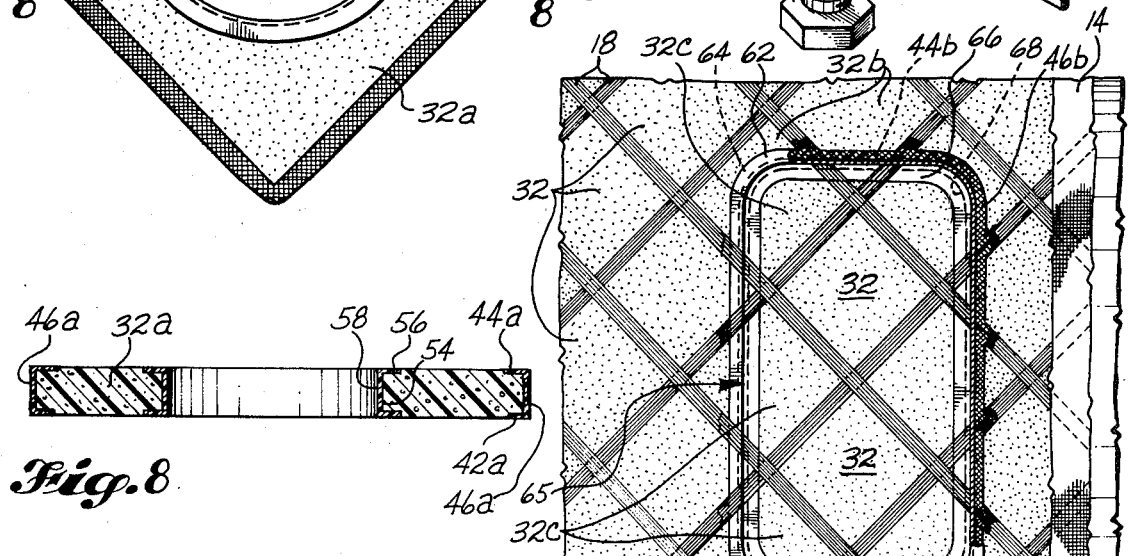

METHOD OF FORMING COMPOSITE WOUND STRUCTURE

This is a division of application Ser. No. 930,457 filed Aug. 2, 1978 now U.S. Pat. No. 4,230,293.

BACKGROUND OF THE INVENTION

Present day airplanes utilize an efficient structure that is lightweight for a given loading. Composite materials are recognized as offering a potential for an even more efficient, weight wise, structure. In U.S. Pat. No. 2,817,484 to Stenzel it shows a fuselage type structure with spirally wound hollow metal members, and longitudinal members both bonded together with a bonding agent.

SUMMARY OF THE INVENTION

An inner and an outer skin of filaments wound circumferentially and longitudinally each have facing crisscrossing helically wound filaments in reinforcing strips. The skins are spaced apart with reinforcing plugs located to contact the strips at the intersections. The plugs have inward extending fastener sockets and the inner skin and reinforcing strips have contiguous openings to permit entry into the sockets. Panels extend between adjacent plugs and the two skins and all the components are integrally joined with resins into a composite structure. Frames for support of openings through the structure are integrally located within the composite.

DESCRIPTION OF THE DRAWINGS

FIG. 6 is a sectional view taken along lines 6—6 of FIG. 2.

FIG. 7 is a sectionalized plan view of a different embodiment of the panel of FIG. 3.

FIG. 8 is a view taken along lines 8—8 of FIG. 7.

FIG. 9 is a perspective view of a spacer used in this invention.

FIG. 10 is a plan view showing framing for an opening through the structure of this invention.

DETAILED DESCRIPTION

Figure 1:
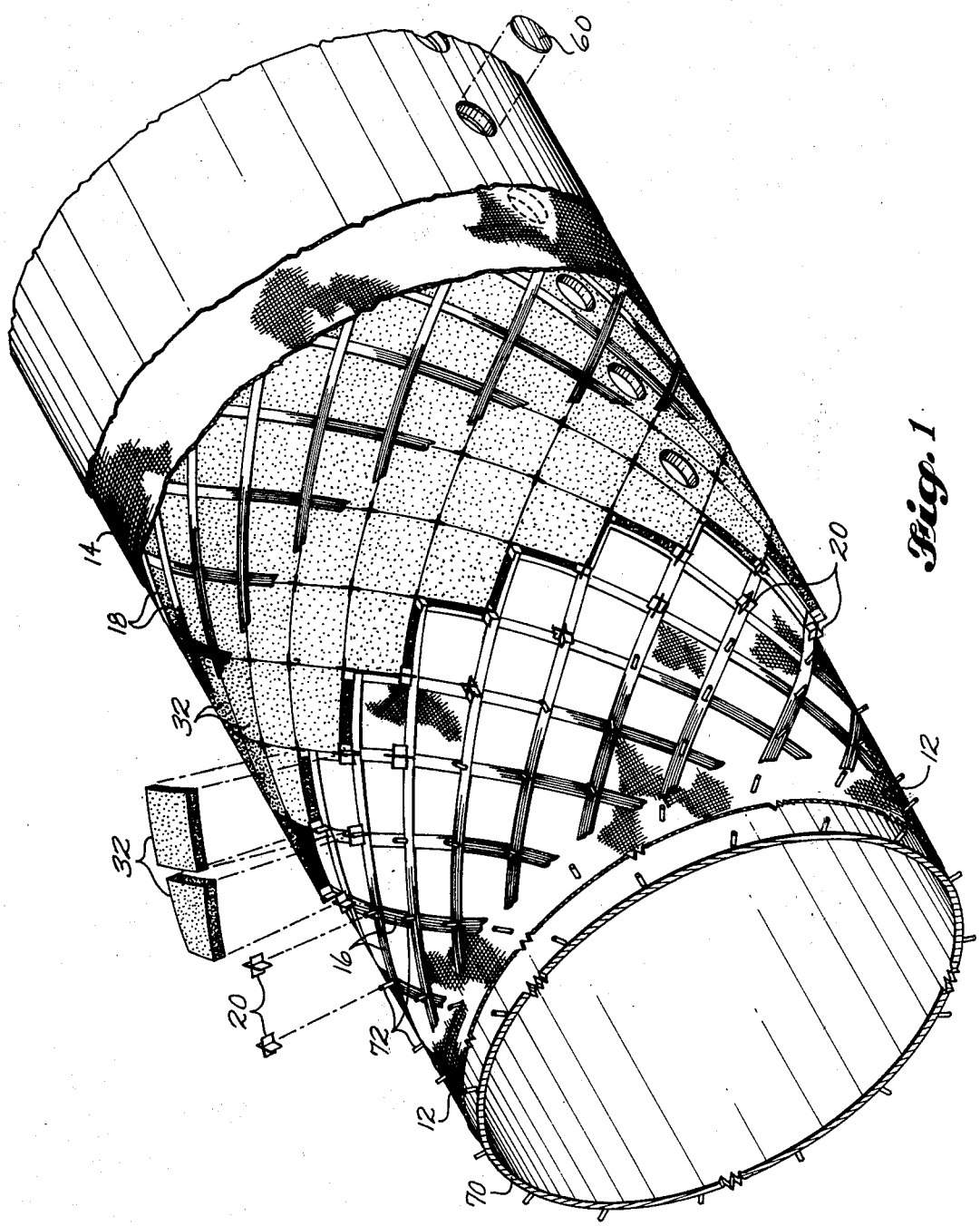
FIG. 1 shows a fragmented perspective view of the composite structure of this invention with parts broken away to show the buildup of the composite.
Figure 2:
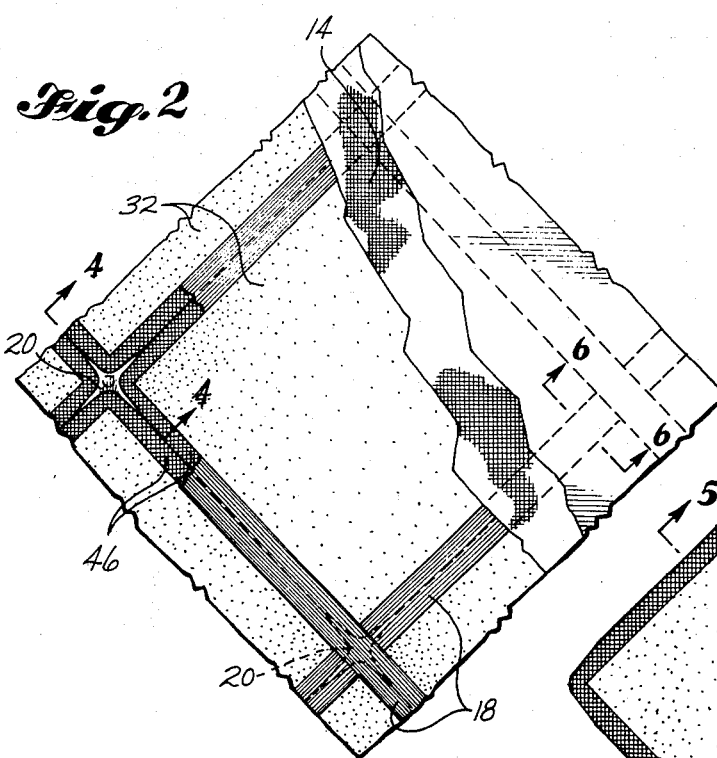
FIG. 2 is a blown up partial plan view of a portion of the structure of FIG. 1.
Figure 3:
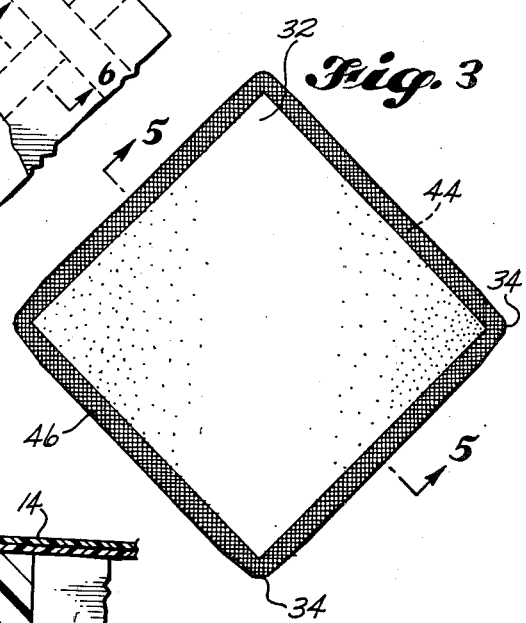
FIG. 3 is a plan view of a panel taken from FIG. 2.
Figure 4:
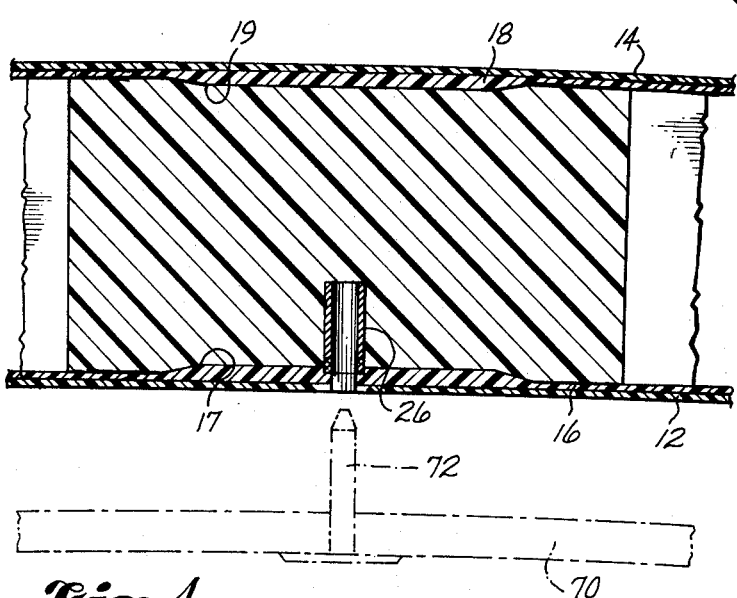
FIG. 4 is a sectional view taken along lines 4—4 of FIG. 2.
Figure 5:
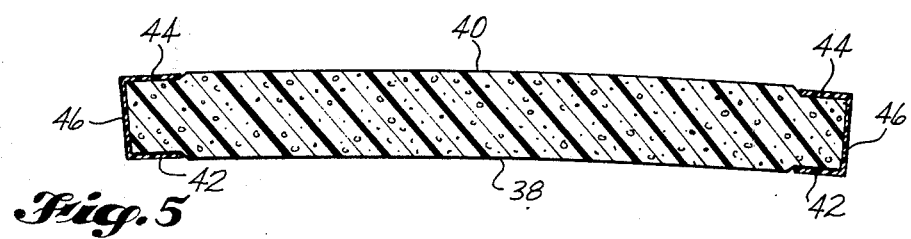
FIG. 5 is a sectional view taken along lines 5—5 of FIG. 3.

An elongate hollow composite structure 10 made up of an inner skin 12 and an outer skin 14 each made up of filaments which preferably are wound at ±10° or essentially longitudinally and others wound at ±80° or essentially circumferentially. These fibers may be any of the high strength fibers such as glass, boron, graphite or kelvar with graphite preferred, and may be in the form of individual filaments, a group of filaments or in a tape. The filament are embedded in a plastic or resin such as an epoxy, a polyamide or a polyimide which may be preimpregnated onto the filaments or may be applied to the wound fibers. A cap or reinforcing strip 16 in a spaced apart pattern such as a geodesic pattern crosscross each other and are in contact with the inner skin, and a similar crisscrossing reinforcing strip 18 is in contact with the outer skin. The center of crossing of these reinforcing cap strips are radially aligned with respect to each other. These strips are each made up of spirally wound filaments embedded in a resin with the same types of fibers and resins as are used in the skins. A series of reinforcing plugs 20 are located to extend between the reinforcing strips with the axis of the plugs extending radially between the intersection of the crisscrossing strips. These plugs, as best shown in FIG. 9, are preferably cruciform in shape with center section 22 and with four tapered blades 24. A socket 26 is axially located in the center section and faces radially inward with respect to the composite structure to accept a fastener such as the bolt 28 shown. The blades are positioned to extend in the direction of the reinforcing strips and are slightly indented top and bottom at 30 to accommodate the extra thickness 17 and 19 of the respective inner and outer reinforcing strips where they cross each other. These reinforcing plugs or spaces may be of any light weight high strength material with chopped graphite fibers embedded in an epoxy resin preferred. Extending to and filling the space between the inner and outer skins with adjoining reinforcing strips are a series of core blocks or panels 32 that are positioned at the corners with the reinforcing plugs and abut each other along the sides. These panels are of a light weight material such as honeycomb or closed cell foamed resins and are contoured to fit the space. These panels are best shown in FIGS. 2, 3 and 5 are shaped at the corners 34 to match the contour of the sides 36 of the reinforcing plugs 20, at bottom 38 and top 40 to match the contour of the skins, and have reduced thickness near the bottom edge 42 and top edge 44 to allow for the reinforcing strips 16 and 18. These panels preferably also have resin impregnated filaments in tapes with the filaments crisscrossing on a bias, or in other words at ±45° with the tape 46 wound around the outer edge 48 and with the tape of a width to overlap part way onto the sides at the bottom and top edges 42 and 44 to extend under the reinforcing strips. When the resins in these positioned components are cured it makes up a composite structure having inner 12 and outer 14 skins spaced apart with core members 32 and reinforcing plugs 20 and reinforced with crisscrossing I beam like members made up of the reinforcing plugs at the intersection and the inner 16 and outer 18 reinforcing strips joined by reinforcing members 46.

A modified panel 32a is used to permit viewing through the structure. In FIGS. 7 and 8 the panel 32a is in two sections with each section cut out at 50 with shaped edges 52 to fit into a U-shaped portion 54 of a windowframe 56. When the two sections are joined around the windowframe the corners 34a, edges 42a and 44a, and resin impregnated biased tape 46a will be shaped to fit between skins 12 and 14 and reinforcing strips 16 and 18, and having corners located by the reinforcing plugs 20. After the composite structure is formed the skins will be cut out around the inside circumference 58 of the windowframe and the skins removed to expose a window opening 60. The transparent material for the window and the details of mounting the same are not shown.

FIG. 10 shows the mounting for a doorframe 62 to provide an opening through the composite structure. The doorframe has a U-shaped outer periphery 64 into which contoured edges 42b and 44b of core panels 32b extend. These edges are shown covered with resin impregnated biased tape 46b. A door 65 has a structural member 66 located adjacent the inside periphery 67 of the doorframe 62. This structural member has a U-shaped inner periphery 68 into which contoured edges of core panels extend. Skins 12 and 14 and reinforcing strips 16 and 18 extend over the doorframe and over the door. Reinforcing plugs 20 are located at the intersection of the reinforcing strips. After the composite is cured the skins and reinforcing strips are cut through around the inside periphery 67 of the doorframe to provide an opening through the structure and to provide a door for the opening.

To prepare the composite a mandrel 70 which has an outside contour which is the shape of the inside wall of the finished structure is used. The mandrel has a series of index pins 72 extending outward in a radial direction and located to be the midpoints for the intersection of reinforcing strips 16. A parting agent is placed over the mandrel and skin 12 is formed using resin impregnated fibers that are laid down in a spiral fashion to completely cover the mandrel with a skin of the desired thickness. For many applications this skin will be of graphite fibers impregnated with epoxy resin, and built up to about 0.022" thick. During the layup of the skins the windings, which spirally wind essentially horizontally and others spirally wind essentially circumferentially, settle around the pins so that the pins protrude through the windings.

Next the cap strips or reinforcing strips 16 of resin impregnated filaments are spirally wound in a spaced apart pattern with the strips intersecting at and settling around the index pins 72. These strips may extend longitudinally and circumferentially, however, it is preferred they be wound at about 45 degrees and in a geodesic pattern and about 0.055" thick.

In the next step the reinforcing spacers or plugs 20 which preferably are cruciform in shape are placed over each of the index pins so that the blades 20 of the spacers extend in the direction of the reinforcing strips 16 and the axis of the plugs extend radially. The index pins extend into the inwardly directed sockets 26 to hold and position the reinforcing plugs. At least some of these sockets are threaded to accept a threaded fastener, however, the index pins insert into the position, but do not thread into the sockets.

The formed core panels 32 are then positioned with surface 38 against the skin 12 and the resin impregnated biased tape 46 that surrounds the edge of the panels contacting the sides 36 of contiguous plugs at the corners and abutting each other elsewhere around the periphery. In those positions where windows are desired a windowframe 56 with special panels 32a are used in place of the regular panels 32. In the locations where doors are desired, the doorframe 62 with adjacent panels 32b, and the doors 65 with adjacent panels 32c replace some of the regular panels 32.

As the next step resin impregnated filaments are wound in strips 18 to crisscross at the axis of the reinforcing plugs. These strips are oriented the same as the first layer of strips 16. A layer of resin impregnated filaments is then laid in a crisscrossing fashion with fibers spirally wound essentially longitudinally and circumferentially to form an outer skin 14. The mandrel with laid up components is then heated to cure the resins and form a composite structure. The core material expands somewhat at the curing temperature to provide pressure on the skins and reinforcing strips. Once the resins are cured the mandrel with index pins is collapsed, the materials are cut away from both the inside and outside layers at the windowframes to expose the windows and from around the doorframes to permit entry into and out of the composite structure.

We claim:

1. A method of preparing a composite fuselage, the steps comprising: utilizing a collapsible mandrel having a plurality of outwardly extending index pins, covering the mandrel with a layer of resin impregnated filaments wound with fiber orientation $\pm 10°$ and at $\pm 80°$ while setting the windings around the index pins so that the pins protrude through, reinforcing the covering with cap strips of resin impregnated filaments wound with fiber orientation at about $\pm 45°$ and the filaments intersect at and settle around the index pins, placing a recessed spacer plug over each index pin, positioning contoured panels with corners of each panel located by adjacent plugs and edges of the panels abutting to cover the surface, winding cap strips with resin impregnated filaments and intersecting the strips over each plug, covering with a layer of resin impregnated filaments wound with fiber orientation at $\pm 10°$ and at $\pm 80°$, curing the resins to form a composite structure, and removing the mandrel with indexing pins.

2. A method of preparing a composite fuselage as in claim 1, steps further comprising: utilizing a cruciform shape for the plugs and positioning said plugs with blades to extend in the direction of the strips.

3. A method of preparing a composite fuselage is in claim 2, steps further comprising: threading the recess in at least some of the spacer plugs for accepting a fastener.

4. A method of preparing a composite fuselage as in claim 1, steps further comprising: wrapping a resin impregnated tape with biased crisscrossing filaments around the edges of the panels prior to placing the panels in position, and selecting biased tape of a width to overlap onto the sides for extending under the cap strips.

5. A method of preparing a composite fuselage as in claim 4, steps further comprising: mounting windowframes in some of the panels before placement of the panels, and cutting away the inner and outer covering member for exposing windows.

6. A method of preparing a composite fuselage as in claim 4, steps further comprising: mounting doorframes in some of the panels before placement of the panels and cutting away the inner and outer covering member for exposing the doorframes.

7. A method of preparing a composite fuselage as in claim 4, steps further comprising: mounting doorframes in some of the panels before placement of the panels and cutting away the inner and outer covering members for exposing doorframe openings and doors within the openings.

* * * * *